United States Patent
Iida et al.

(10) Patent No.: US 6,374,813 B1
(45) Date of Patent: Apr. 23, 2002

(54) VALVE DURING APPARATUS AND METHOD FOR INTERNAL COMBUSTION ENGINE

(75) Inventors: Tatsuo Iida, Anjo; Takashi Izuo, Toyota; Masahiko Asano, Toyota; Hiroyuki Hattori, Toyota, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/614,609

(22) Filed: Jul. 12, 2000

(30) Foreign Application Priority Data

Jul. 12, 1999 (JP) .......................................... 11-197403

(51) Int. Cl.[7] ............................................. F02M 25/07
(52) U.S. Cl. .................................. 123/568.14; 123/90.15
(58) Field of Search ........................... 123/568.14, 90.11, 123/90.15

(56) References Cited

U.S. PATENT DOCUMENTS

| 5,203,830 A | * | 4/1993 | Faletii et al. | .......... | 123/568.14 |
| 5,682,854 A | * | 11/1997 | Ozawa | .................. | 123/568.14 |
| 5,870,993 A | * | 2/1999 | Stellet et al. | .......... | 123/568.14 |

FOREIGN PATENT DOCUMENTS

JP (P) HEI 02-294547    5/1990

* cited by examiner

*Primary Examiner*—Gene Mancene
*Assistant Examiner*—Arnold Castro
(74) *Attorney, Agent, or Firm*—Kenyon & Kenyon

(57) ABSTRACT

In an internal combustion engine having a plurality of electromagnetically driven valves for each cylinder, when an required EGR amount Er is relatively small during an exhaust gas recirculation performed independently of the exhaust stroke, a first exhaust gas recirculation mode is entered by driving only a first exhaust valve of each cylinder. An open valve duration Td1 for achieving the required EGR amount Er in a one-valve drive manner is longer than a corresponding open valve duration in a two-valve drive manner. Therefore, even if the required EGR amount Er is small, a "one-valve drive in pattern 1" mode can be achieved provided that Td1>a. That is, the incidence of performing the control in pattern 2, which allows only a narrow range of control, can be reduced. Hence, degradation of controllability can be prevented even if the required EGR amount Er is small.

15 Claims, 14 Drawing Sheets

(PATTERN 2)

VALVE DURING APPARATUS AND METHOD FOR INTERNAL COMBUSTION ENGINE

INCORPORATION BY REFERENCE

The disclosure of Japanese Patent Application No. HEI 11-197403 filed on Jul. 12, 1999 including the specification, drawings and abstract is incorporated herein by reference in its entirety.

BACKGROUND OF THE INVENTION

1. Field of the Invention

The present invention relates to a valve driving apparatus and a valve driving method for an internal combustion engine in which each cylinder is provided with a plurality of exhaust valves that are electromagnetically opened and closed.

2. Description of the Related Art

To improve the fuel economy and emission quality of internal combustion engines, exhaust gas recirculation (hereinafter, referred to as "EGR") systems for introducing exhaust gas into combustion chambers have been developed. Of the EGR systems, a generally-termed internal EGR system, in particular, controls the open-close timing of exhaust valves so that exhaust gas flows back into the combustion chambers during the intake stroke.

In an internal combustion engine equipped with electromagnetically driven exhaust valves, in particular, an appropriate amount of EGR can be achieved by adjusting the open-close timing of the. exhaust valves and the valve lift thereof in accordance with the operational condition of the engine, as described in Japanese Patent Application Laid-Open No. HEI 2-294547.

In some engines, each cylinder is provided with a plurality of electromagnetically driven exhaust valves. By simultaneously driving the exhaust valves of each cylinder of such an engine, the flow resistance can be reduced during the exhaust stroke so as to quickly discharge exhaust gas. However, if the required EGR amount is relatively small during the EGR control, it becomes necessary to open and close each exhaust valve in a very short time. Furthermore, if the required EGR is small, adjustment based on the valve lift becomes necessary.

To open an electromagnetically driven valve, a series of operations is performed based on the characteristics of the electromagnetically driven valve. That is, the valve body of the electromagnetically driven valve is released from a state in which the valve body is fixed at a closed valve position by controlling the electromagnetic force, and then the valve body is moved to and fixed at an open valve position by using electromagnetic force and a spring force. To close the electromagnetically driven valve, a series of operations for releasing the valve body from a state in which the valve body is fixed at the open valve position through control of the electromagnetic force and then moving the valve body to and fixing it in the closed valve position by using the electromagnetic force and the spring force is performed. Therefore, the valve opening timing is controlled based on a combination of the valve opening operation and the valve closing operation described above. Since a minimum operation time exists for each of the valve operations, the reduction of the EGR amount is also limited.

To achieve a reduced valve lift of an electromagnetically driven valve, a series of operations is performed. That is, the valve body of the electromagnetically driven valve is temporarily released from the state in which the valve body is fixed at the open valve position through control of the electromagnetic force, and then the valve body is moved back to and fixed at the closed valve position by the electromagnetic force. During the operation of temporarily releasing the valve body and then returning the valve body to the original position, the valve body temporarily undergoes a floating state. Therefore, the valve lift pattern is susceptible to environmental changes.

Therefore, in an engine in which a plurality of electromagnetically driven valves are provided for each cylinder, controllability of the EGR amount may degrade if the required EGR amount is relatively small.

SUMMARY OF THE INVENTION

Accordingly, it is an object of the invention to provide a valve driving apparatus and a valve driving method for an internal combustion engine having a plurality of electromagnetically driven valves for each cylinder that are capable of preventing degradation of the controllability of the EGR amount even if the EGR amount is small.

To achieve the aforementioned and other objects, a valve driving apparatus for an internal combustion engine in accordance with a first aspect of the invention includes a plurality of electromagnetically operated exhaust valves that are provided for each cylinder of the internal combustion engine, the plurality of exhaust valves including at least one first exhaust valve and at least one second exhaust valve. The valve driving apparatus comprises an exhaust valve driver which, in a first mode when exhaust gas recirculation is performed independently of an exhaust stroke, drives the at least one first exhaust valve and does not drive the at least one second exhaust valve. In this valve driving apparatus, the exhaust valve driver performs the exhaust gas recirculation by driving only a limited number of the plurality of exhaust valves of each cylinder, instead of driving all the exhaust valves, when the exhaust gas recirculation is performed independently of the exhaust stroke. Therefore, the open valve duration of the exhaust valves for achieving the required ECR amount becomes longer than the corresponding open valve duration in the case where all the exhaust valves are driven. Furthermore, the incidence of a case where adjustment based on the amount of valve lift is needed is reduced.

Therefore, the degradation of the controllability of the EGR amount can be substantially prevented even if the required EGR amount is small.

In the first aspect of the invention, the valve driving apparatus may further include an exhaust gas recirculation amount calculator that determines a required exhaust gas recirculation amount in accordance with an operational condition of the internal combustion engine. During the exhaust gas recirculation performed independently of the exhaust stroke, the exhaust valve driver enters a first exhaust gas recirculation mode of performing the exhaust gas recirculation by driving only the limited number of the plurality of exhaust valve of each cylinder, when the required exhaust gas recirculation amount determined by the exhaust gas recirculation amount calculator is less than a recirculation amount criterion. When the required exhaust gas recirculation amount is greater than the recirculation amount criterion, the exhaust valve driver enters a second exhaust gas recirculation mode of performing the exhaust gas recirculation by driving all the plurality of exhaust valves of each cylinder.

That is, if the required EGR amount (required exhaust gas recirculation amount) determined by the exhaust gas recirculation amount calculator is less than the recirculation amount criterion in the exhaust gas recirculation performed independently of the exhaust stroke, the exhaust valve driver enters the first exhaust gas recirculation mode, that is, performs the exhaust gas recirculation by driving only the limited number of exhaust valve of each cylinder. Therefore, the open valve duration of the exhaust valves for achieving the required EGR amount becomes relatively long, and the incidence of adjustment based on the amount of valve lift becomes relatively low. Hence, the degradation of the controllability can be substantially prevented even if the required EGR amount is small.

When the required exhaust gas recirculation amount is greater than the recirculation amount criterion, the exhaust valve driver may enter the second exhaust gas recirculation mode, that is, perform the exhaust gas recirculation by driving all the exhaust valves of each cylinder. Thus, the exhaust gas recirculation is performed by driving all the exhaust valves if, despite driving all the exhaust valves, the open valve duration of the exhaust valves does not become so short as to degrade the controllability. Therefore, even if the required EGR amount is considerably great, the exhaust gas recirculation can be reliably and appropriately performed.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the invention will be described in detail hereinafter with reference to the accompanying drawings. A first preferred embodiment will first be described.

Figure 1:
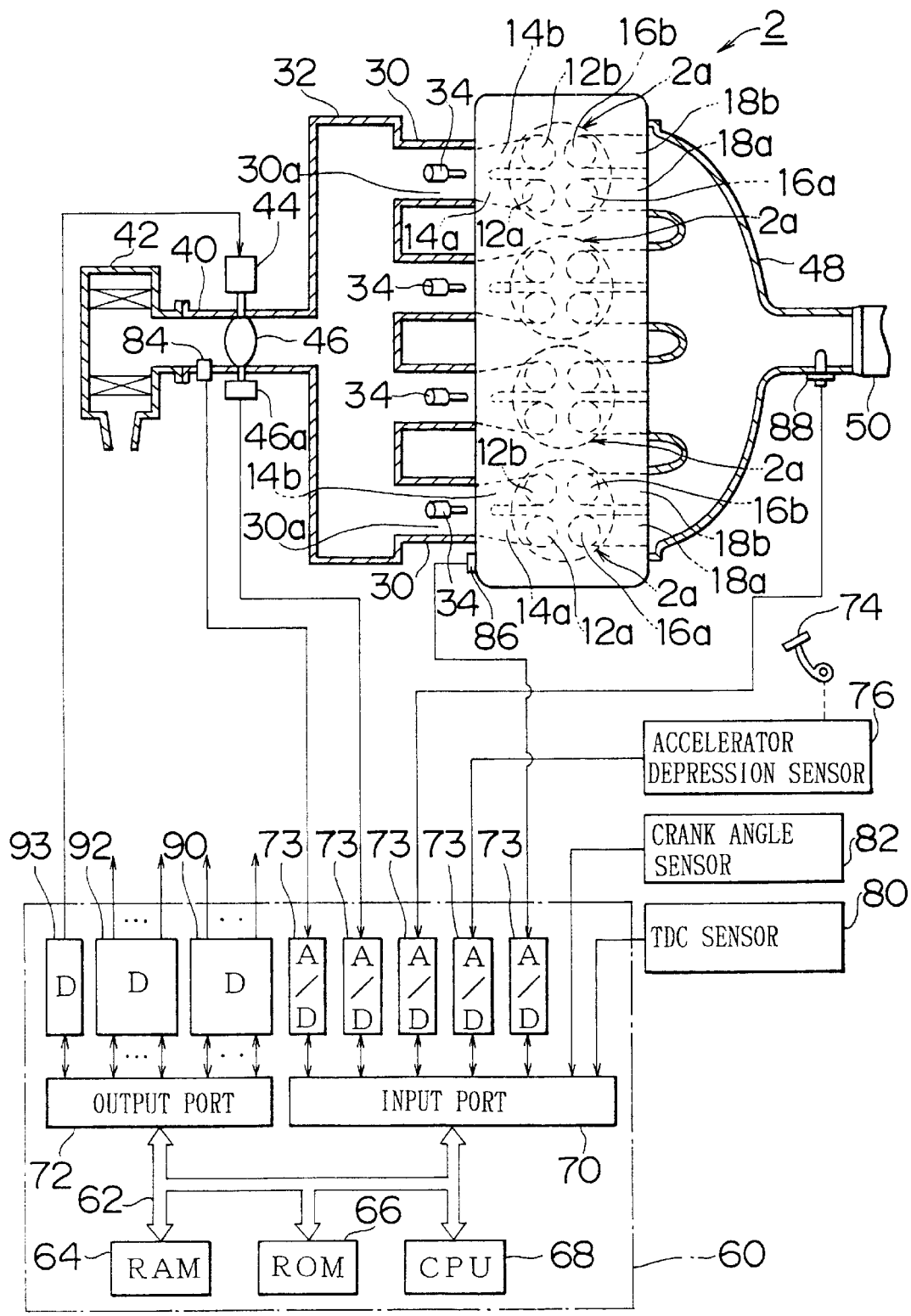
FIG. 1 is a schematic block diagram of an engine and its control system according to a first embodiment of the invention.
Figure 2:
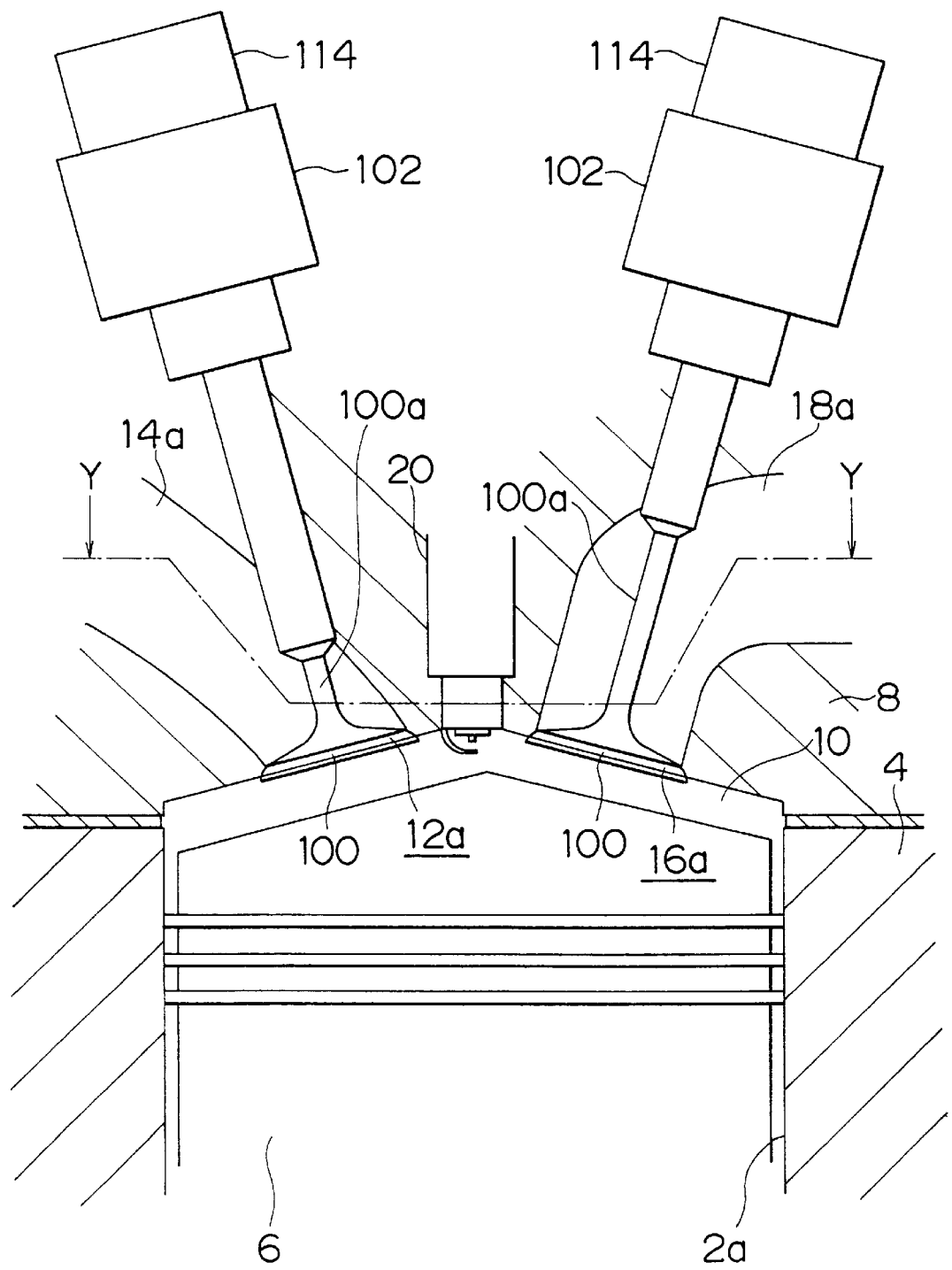
FIG. 2 is a longitudinal sectional view of the engine of the first embodiment.
Figure 3:
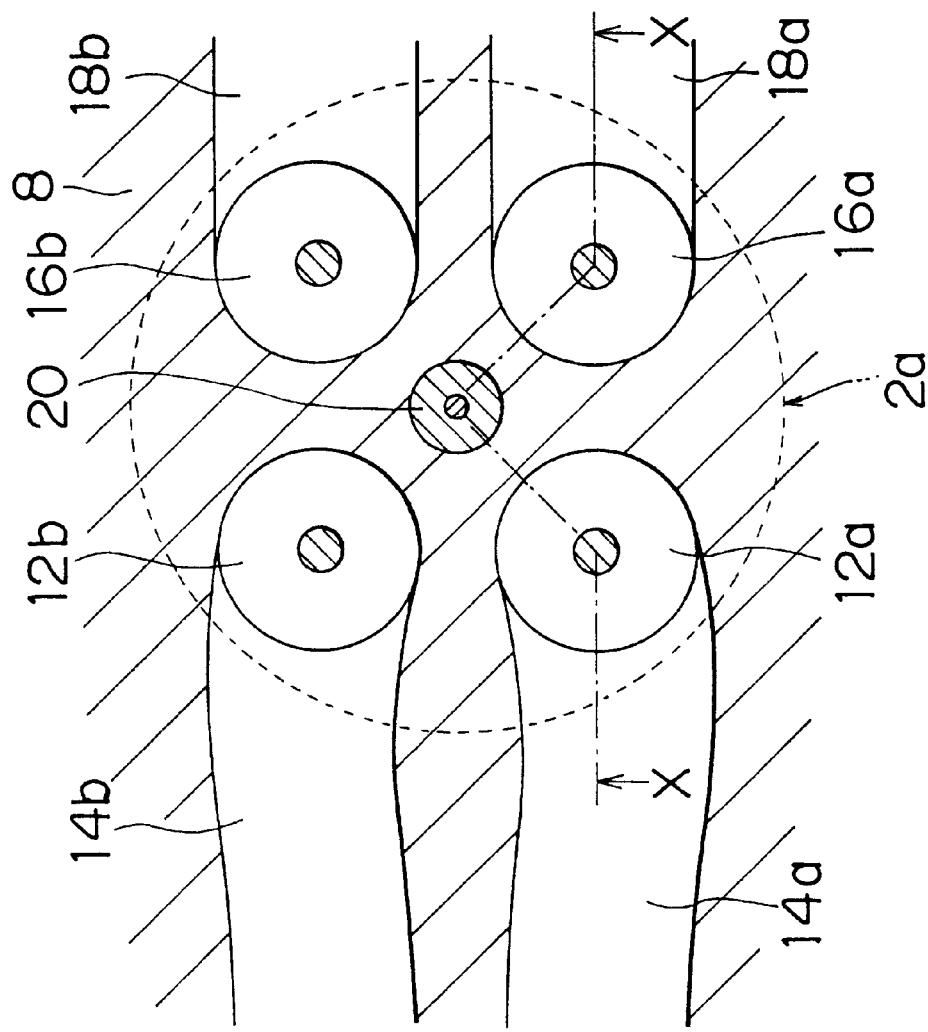
FIG. 3 is a sectional view taken on plane Y-Y in FIG. 2.

FIG. 1 is a schematic block diagram of a construction of an internal combustion gasoline engine (hereinafter, referred to simply as "engine") 2 to which the invention is applied, and a control system of the engine 2. FIG. 2 is a longitudinal sectional view of the engine 2, taken on plane X—X in FIG. 3. FIG. 3 is a sectional view of the engine 2, taken on plane Y-Y in FIG. 2.

The engine 2 is installed in a motor vehicle so as to drive the vehicle. The engine 2 has four cylinders 2a. Each cylinder 2a has a combustion chamber 10 that is defined by a cylinder block 4, a cylinder head 8 mounted on the cylinder block 4, and a piston 6 disposed inside the cylinder block 4 for reciprocating movements.

Each combustion chamber 10 is provided with a first intake valve 12a, a second intake valve 12b, a first exhaust valve 16a and a second exhaust valve 16b. The valves 12a, 12b, 16a, 16b are formed as electromagnetically driven valves. The valves of each cylinder 2a are disposed so that the first intake valve 12a opens and closes a first intake port 14a, the second intake valve 12b opens and closes a second intake port 14b, the first exhaust valve 16a opens and closes a first exhaust port 18a, and the second exhaust valve 16b opens and closes a second exhaust port 18b.

As shown in FIG. 1, the first intake port 14a and the second intake port 14b of each cylinder 2a are connected to a surge tank 32 via an intake passage 30a formed in an intake manifold 30. Each intake passage 30a is provided with a fuel injection valve 34 for injecting a needed amount of fuel into the first and second intake ports 14a and 14b.

The surge tank 32 is connected to an air cleaner 42 via an intake duct 40. A throttle valve 46 that is driven by a motor 44 (a DC motor or a step motor) is disposed in the intake duct 40. The degree of opening of the throttle valve 46 (throttle opening TA) is detected by a throttle opening sensor 46a, and is controlled in accordance with operational conditions of the engine 2 and the operation of an accelerator pedal 74.

The first exhaust port 18a and the second exhaust port 18b of each cylinder 2a are connected to an exhaust manifold 48, whereby exhaust gas is led to a catalytic converter 50 and then is released to the atmosphere.

An electronic control unit (hereinafter, referred to as "ECU") 60 is formed by a digital computer equipped with a RAM (random access memory) 64, a ROM (read-only memory) 66, a CPU (microprocessor) 68, an input port 70, and an output port 72 that are interconnected by a bidirectional bus 62.

The throttle opening sensor 46a for detecting the throttle opening TA outputs a voltage proportional to the degree of opening of the throttle valve 46, and the output voltage is inputted to the input port 70 via an A/D converter 73. The accelerator pedal 74 is provided with an accelerator depression sensor 76 that outputs a voltage proportional to the amount of depression of the accelerator pedal 74 (hereinafter, referred to as "accelerator depression ACCP"). The output voltage of the accelerator depression sensor 76 is inputted to the input port 70 via an A/D converter 73. A top dead center sensor 80 generates an output pulse when, for example, the No. 1 cylinder of the cylinders 2a reaches the top dead center. The output pulse of the top dead center sensor 80 is inputted to the input port 70. A crank angle sensor 82 generates an output pulse every time a crankshaft turns 30°. The output pulse of the crank angle sensor 82 is inputted to the input port 70. Based on the output pulse of the top dead center sensor 80 and the output pulse of the crank angle sensor 82, the CPU 68 calculates a present crank angle. Based on the frequency of output pulses of the crank angle sensor 82, the CPU 68 calculates an engine revolution speed.

The intake duct 40 is provided with an intake air amount sensor 84 that outputs a voltage corresponding to an amount of intake air GA flowing through the intake duct 40. The output voltage of the intake air amount sensor 84 is inputted to the input port 70 via an A/D converter 73. The cylinder block 4 of the engine 2 is provided with a water temperature senor 86 that detects the temperature THW of cooling water of the engine 2 and outputs a voltage in accordance with the cooling water temperature THW to the input port 70 via an A/D converter 73. The exhaust manifold 48 is provided with an air-fuel ratio sensor 88 that outputs a voltage in accordance with the air-fuel ratio, to the input port 70 via an A/D converter 73.

Various other signals are also inputted to the input port 70, although they are not indicated in the drawings since they are not important for the description of the first embodiment.

The output port 72 is connected to the fuel injection valves 34 via a corresponding drive circuit 90. In accordance with the operational condition of the engine 2, the ECU 60 performs a control of opening each fuel injection valve 34, and performs a fuel injection timing control and a fuel injection amount control. The output port 72 is also connected to the intake valves 12a, 12b and the exhaust valves 16a, 16b, via a drive circuit 92. In accordance with the operational condition, the ECU 60 performs a control of opening the valves 12a, 12b, 16a, 16b, and performs an intake air amount control, an exhaust control, and an internal EGR control. The output port 72 is also connected to the motor 44 via a drive circuit 93. The ECU 60 controls the degree of opening of the throttle valve 46 in accordance with the operational condition of the engine 2 and the accelerator depression ACCP.

Figure 4:
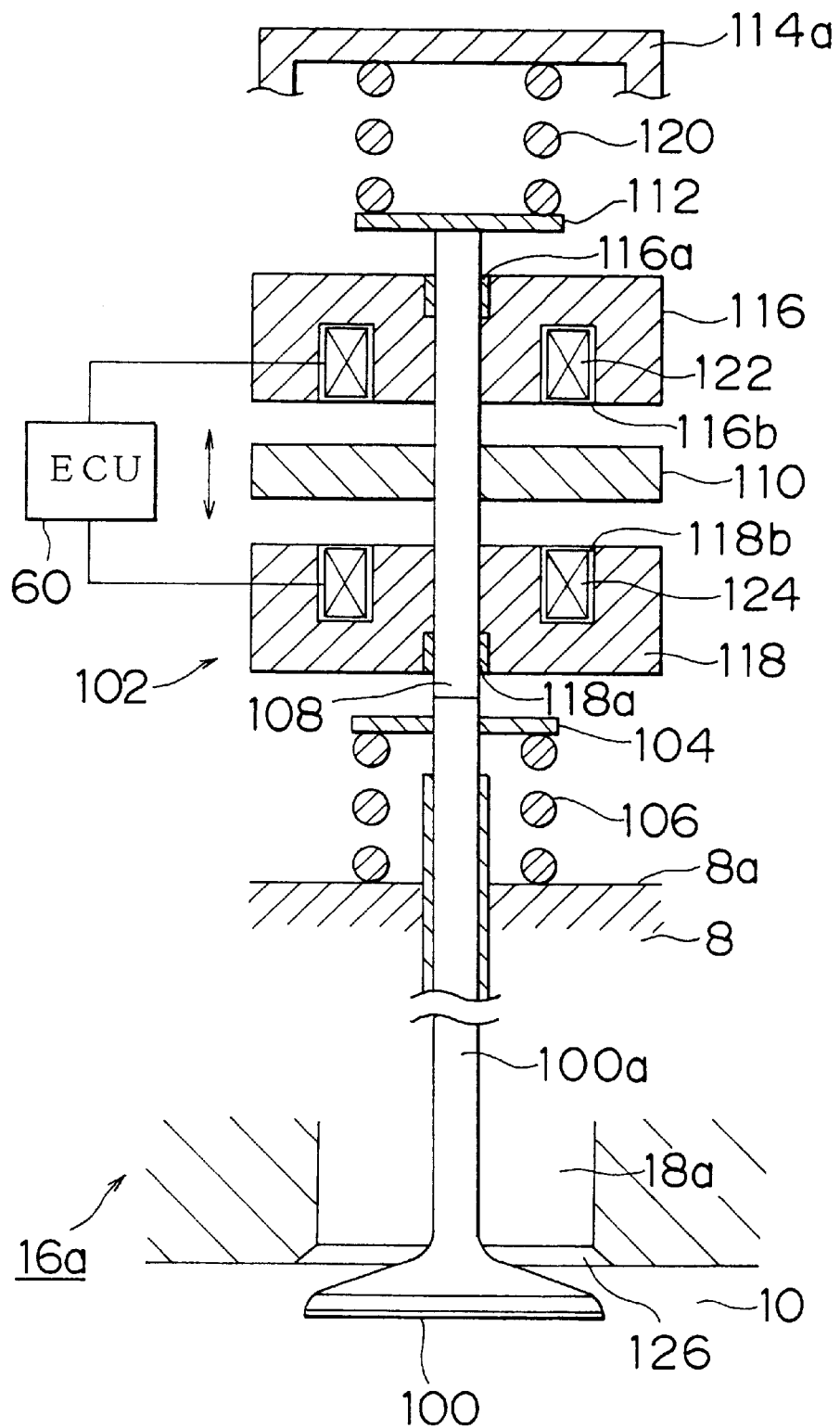
FIG. 4 is an illustration of a construction of a first exhaust valve in the first embodiment.

The constructions of the intake valves 12a, 12b and the exhaust valves 16a, 16b formed as electromagnetically driven valves will be described below. Since these electromagnetically driven valves have substantially the same basic construction, the first exhaust valve 16a of a cylinder 2a will be described as a representative. FIG. 4 illustrates an internal construction of the first exhaust valve 16a.

The first exhaust valve 16a has a valve body 100, a valve shaft 100a extending from the valve body 100, and an electromagnetic drive unit 102. The valve shaft 100a has a lower retainer 104 that is fixed to an end portion of the valve shaft 100a opposite from the valve body 100. A compressed lower spring 106 is disposed between the lower retainer 104 and a spring support surface 8a that is formed on the cylinder head 8. The lower retainer 104 urges the valve body 100 and the valve shaft 100a in such a direction that the valve body 100 and the valve shaft 100a move away from the combustion chamber 10, that is, in such a direction that the valve body 100 closes the first exhaust port 18a.

The electromagnetic drive unit 102 has, in a central portion thereof, an armature shaft 108 that extends coaxially with the valve shaft 100a. The armature shaft 108 has a high magnetic permeability material-made armature 110 that is fixed to a substantially central portion of the armature shaft 108, and an upper retainer 112 that is fixed to an end of the armature shaft 108. An end portion of the armature shaft 108 remote from the upper retainer 112 is in contact with an end portion of the valve shaft 100a closer to the lower retainer 104.

An annular upper core 116 is fixed inside a casing 114 (FIG. 2) of the electromagnetic drive unit 102, at a position between the upper retainer 112 and the armature 110, with the armature shaft 109 extending through the upper core 116. An annular lower core 118 is fixed inside the casing 114 of the electromagnetic drive unit 102, at a side of the armature 110 opposite from the upper core 116, with the armature shaft 108 extending through the lower core 118. The casing 114 is fixed to the cylinder head 8. The upper core 116 and the lower core 118 are supported slidably along the armature shaft 108 by bushes 116a, 118a each of which is provided in a central through-hole of the corresponding one of the upper core 116 and the lower core 118.

A compressed upper spring 120 is disposed between the upper retainer 112 fixed to the upper end of the armature shaft 108 and an upper cap 114a provided in the casing 114. The upper spring 120 urges the armature shaft 108 to the valve shaft 100a. Therefore, the valve shaft 100a and the valve body 100 receive forces from the lower spring 106 and the upper spring 120 in opposite directions.

The upper core 116 is formed from a high magnetic permeability material, and has an annular groove 116b that extends around the armature shaft 108 extending through the upper core 116 in a slidable manner. The annular groove 116b opens toward the armature 110. An exciting upper coil 122 is disposed in the annular groove 116b.

Similarly, the lower core 118 is formed from a high magnetic permeability material, and has an annular groove 118b that extends around the armature shaft 108 extending through the lower core 118 in a slidable manner. The annular groove 118b opens toward the armature 110. An exciting upper coil 124 is disposed in the annular groove 118b.

FIG. 4 shows a state in which neither the upper coil 122 nor the lower coil 124 is supplied with an exciting current. In this state, since the armature 110 is not magnetically attracted toward either the upper core 116 or the lower core 118, the armature shaft 108 and the valve shaft 100a exist at a position where the forces mainly from the upper spring 120 and the lower spring 106 balance each other. In the state shown in FIG. 4, therefore, the valve body 100 is slightly apart from a valve seat 126, and the first exhaust port 18a is half open.

Next described will be a first exhaust valve 16a closing operation performed by supplying a control current from the ECU 60.

When the upper coil 122 is supplied with an exciting current, the upper core 116 magnetized by the upper coil 122 attracts the armature 110. The attracting force moves the armature 110 to contact the upper core 116, overcoming the force from the upper spring 120.

After the armature 110 is brought into contact with the upper core 116, the exciting current is reduced to a current that is needed to hold the armature 110 in position (hereinafter, referred to as "hold current"), as indicated in a portion preceding time point t1 in a timing chart in FIG. 5 that indicates an operation of the first exhaust valve 16a. Thus, the contact state is maintained. When the armature 110 is held in contact with the upper core 116 by the magnetic force from the upper coil 122, the valve body 100 contacts the valve seat 126, thereby completely closing the first exhaust port 18a.

The operation of opening the first exhaust valve 16a from the completely closed state will be described.

Figure 5:
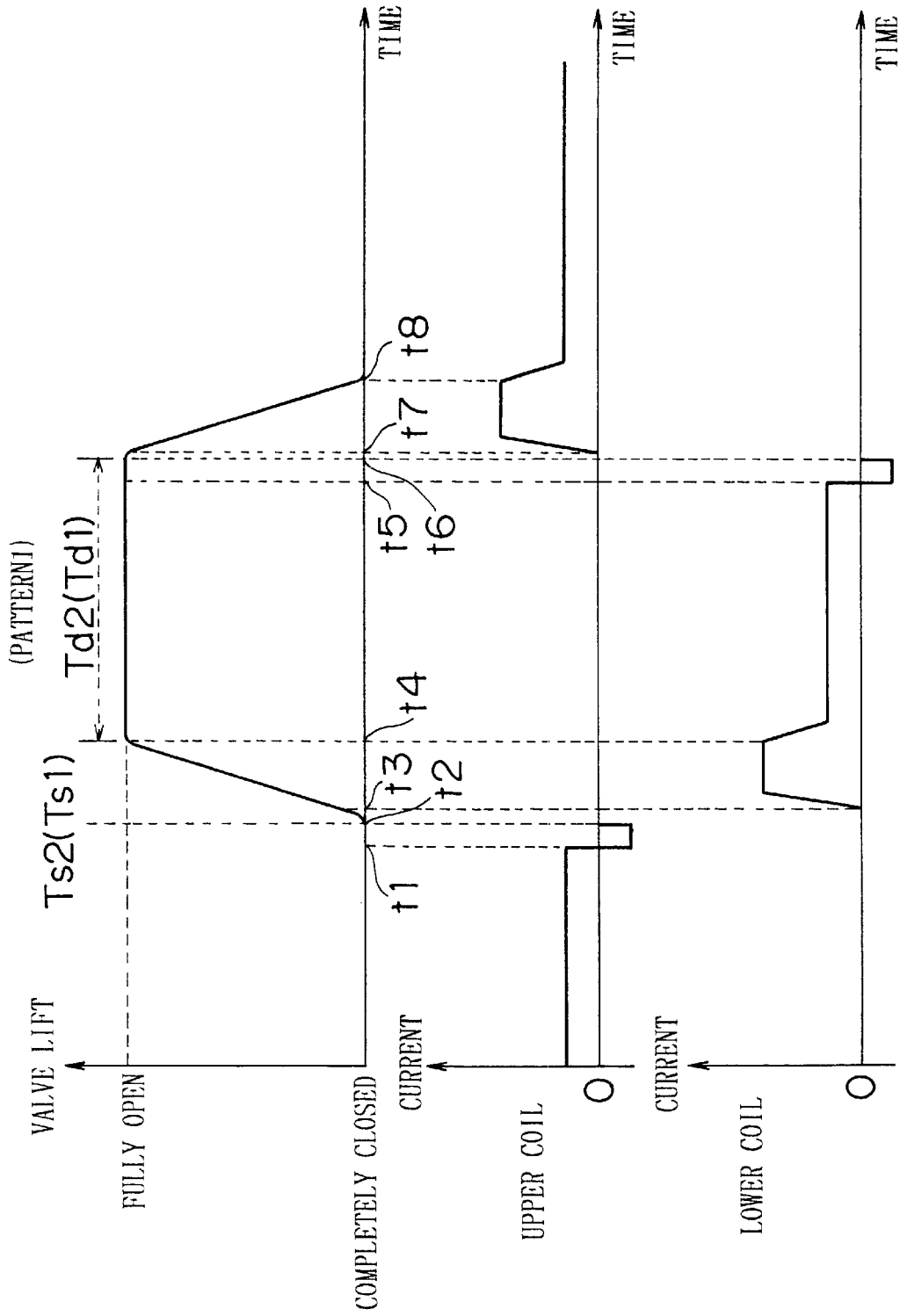
FIG. 5 is a timing chart indicating an operation of the first exhaust valve in pattern 1.

As shown in FIG. 5, the attraction force from the upper core 116 that holds the armature 110 is quickly removed (time t1–t2) by supplying the upper coil 122 with a reverse current (hereinafter, referred to as "release current") opposite in direction to the hold current. The current supplied to the upper coil 122 is changed to zero at time point t2. Upon the discontinuation of the force drawing the armature 110 toward the upper core 116, the armature 110 starts to move toward the lower core 118, that is, toward the fully open state, due to the force from the upper spring 120. Thus, the valve body 100 starts to separate from the valve seat 126, and the valve lift starts to increase.

In order to draw the armature 110 into contact with the lower core 118, a great current (hereinafter, referred to as "draw current") is supplied to the lower coil 124 (time t3–t4) to draw the armature 110, which has been released from the upper core 116, until the armature 110 contacts the lower core 118.

When the armature 110 contacts the lower core 118 (time point t4), the current is reduced to the hold current (time t4–t5). By holding the armature 110 in contact with the lower core 118 in this manner, the armature 110 is held in a state where the valve body 100 is farthest apart from the valve seat 126, that is, a fully open state.

The operation of closing the first exhaust valve 16a from the fully open state will be described below.

To end the open valve period of the first exhaust valve 16a, the hold current supplied to the lower coil 124 is changed to the release current (time point t5), whereby the attraction force of the lower core 118 holding the armature 110 is rapidly removed (time t5–t6). At time point t6, the current through the lower coil 124 is set to zero. Upon discontinuation of the attraction force in the direction to the lower core 118, the armature 110 starts to move toward the upper core 116, that is, toward the completely closed state, due to the force from the lower spring 106. Thus, the valve body 100 starts to move toward the valve seat 126, and the valve lift starts to decrease.

Then, to draw the armature 110 into contact with the upper core 116, the draw current is supplied to the upper coil 122 (time t7–t8). Thus, the armature 110, which has been released from the lower core 118, is drawn until the armature 110 contacts the upper core 116.

When the armature 110 contacts the upper core 116 (time point t8), the current through the upper coil 122 is reduced to the hold current (from time t8 on). By holding the armature 110 in contact with the upper core 116 in this manner, the valve body 100 is held in contact with the valve seat 126, that is, the completely closed state.

The operations of opening and closing the first exhaust valve 16a are performed as described above.

A reduced valve lift of the first exhaust valve 16a can be achieved by using a drive method that is different from the above-described drive method. The drive method for achieving a reduced valve lift will be described with reference to the timing chart of FIG. 6.

By supplying the release current to the upper coil 122 (time point t11), which has been held in contact with the upper core 116 by the hold current, the attraction force of the upper core 116 holding the armature 110 is rapidly diminished (time t11–t12). Upon discontinuation of the attraction force in the direction to the upper core 116, the armature 110 starts to move toward the lower core 118, that is, toward the fully open sate, due to the force from the upper spring 120. Thus, the valve body 100 starts to move apart from the valve seat 126, and the valve lift starts to increase.

Then, the current supplied to the upper core 116 is changed from the release current to the draw current (time point t12). Upon the supply of the draw current to the upper core 116, the armature 110, which has moved apart from the upper core 116, is stopped in partway to the lower core 118, and is drawn back toward the upper core 116. Thus, the valve seat 126, which has moved apart from the valve seat 126, starts to move toward the valve seat 126. That is, during this operation, the valve lift temporarily increases, and then starts to decrease before it reaches a maximum lift (i.e., the fully open state).

Figure 6:
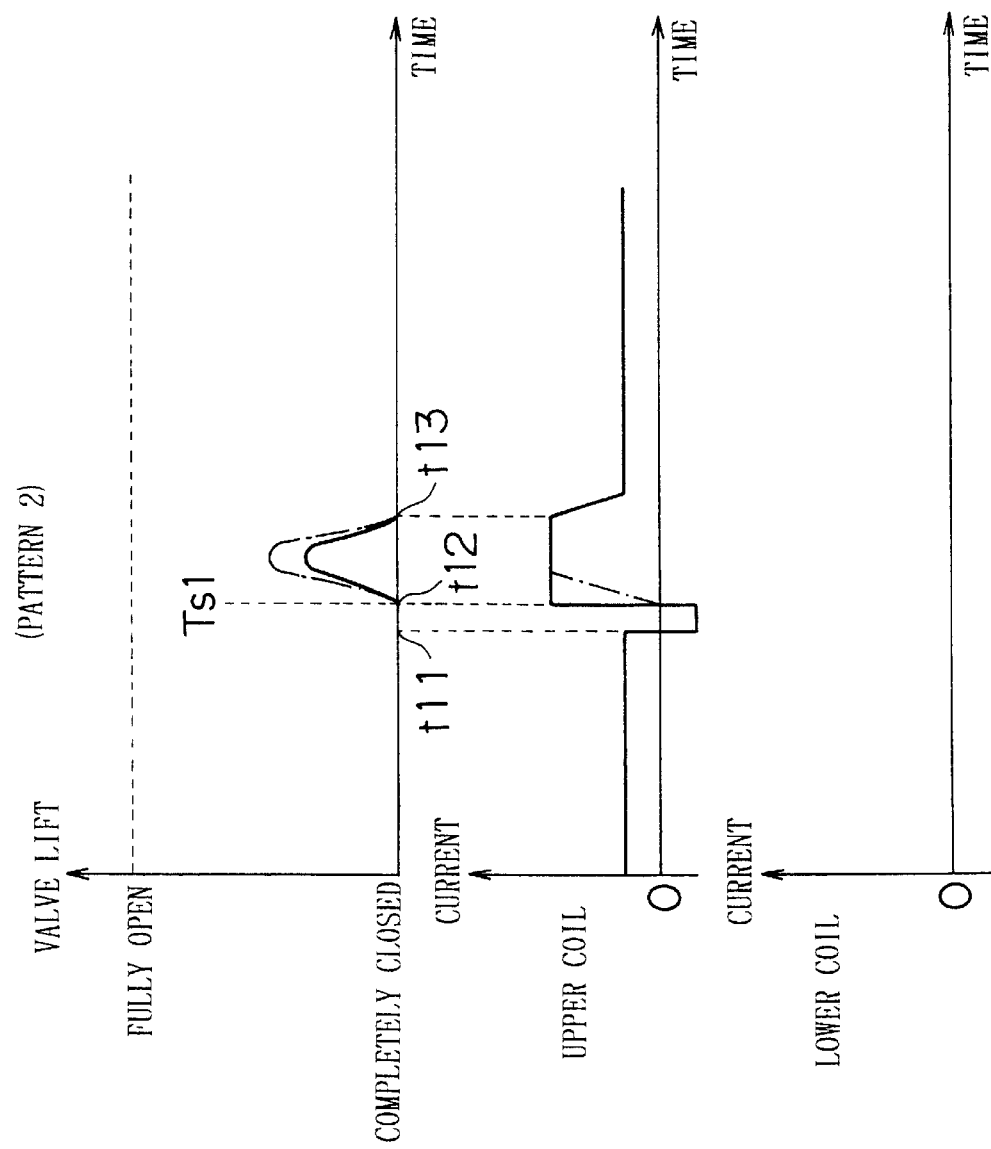
FIG. 6 is a timing chart indicating an operation of the first exhaust valve in pattern 2.

When the armature 110 comes back into contact with the upper core 116 (time t13), the current supplied to the upper core 116 is changed from the draw current to the hold current. In this manner, a valve pattern in which the valve lift does not reach the maximum lift (the fully open state) is achieved as indicated in FIG. 6, thereby realizing a very small internal EGR amount. The internal EGR amount achieved in this method can be adjusted as indicated by a one-dot chain line in FIG. 6, by adjusting the rate of rise of the draw current at time point t12 or adjusting the magnitude of the draw current.

Hereinafter, a valve open/close pattern as indicated in FIG. 5 which is followed by the first exhaust valve 16a and the second exhaust valve 16b for internal EGR while the combustion chamber 10 is expanding in capacity will be referred to as "pattern 1", and a valve open/close pattern as indicated in FIG. 6 that is followed by the first exhaust valve 16a and the second exhaust valve 16b will be referred to as "pattern 2". In pattern 1, an internal EGR is determined by the length of time during which the armature 110 is held to the lower core 118 by the magnetic attraction force produced by the lower coil 124. In pattern 2, an internal EGR amount is determined by the lift pattern followed by the valve body 100 during the operation of temporarily moving the valve body 100 apart from the valve seat 126 and then moving the valve body 100 back to the valve seat 126. Therefore, pattern 2 tends to allow a control range less than that of pattern 1, in which the valve body 100 is opened by the magnetic attraction force that is actively produced by the lower coil 124. Pattern 2 has this tendency probably because during a period between the release from the magnetic attraction and the return to the upper core 116 in pattern 2, the armature 110 temporarily undergoes a floating state, and therefore is susceptible to ambient conditions.

Figure 7:
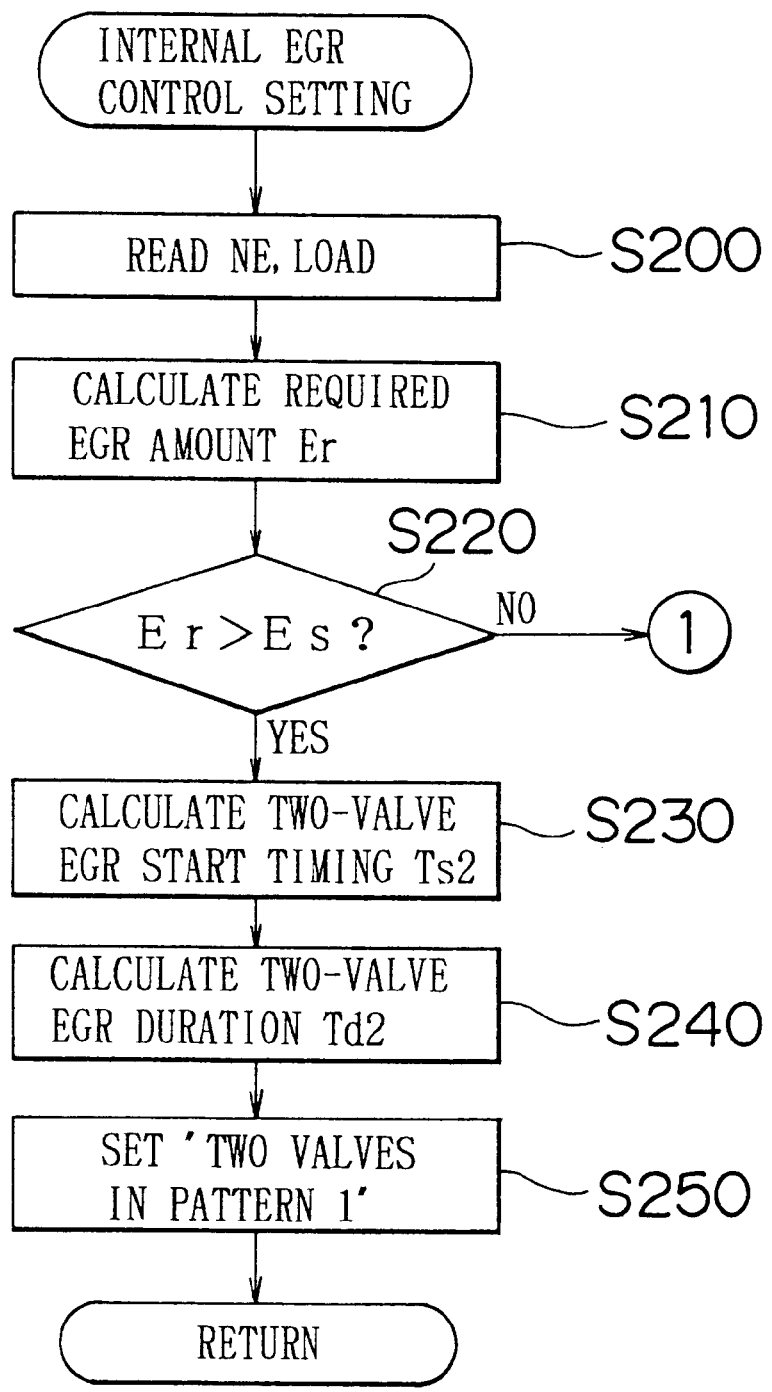
FIG. 7 is a flowchart illustrating an internal EGR control setting operation in the first embodiment.
Figure 8:
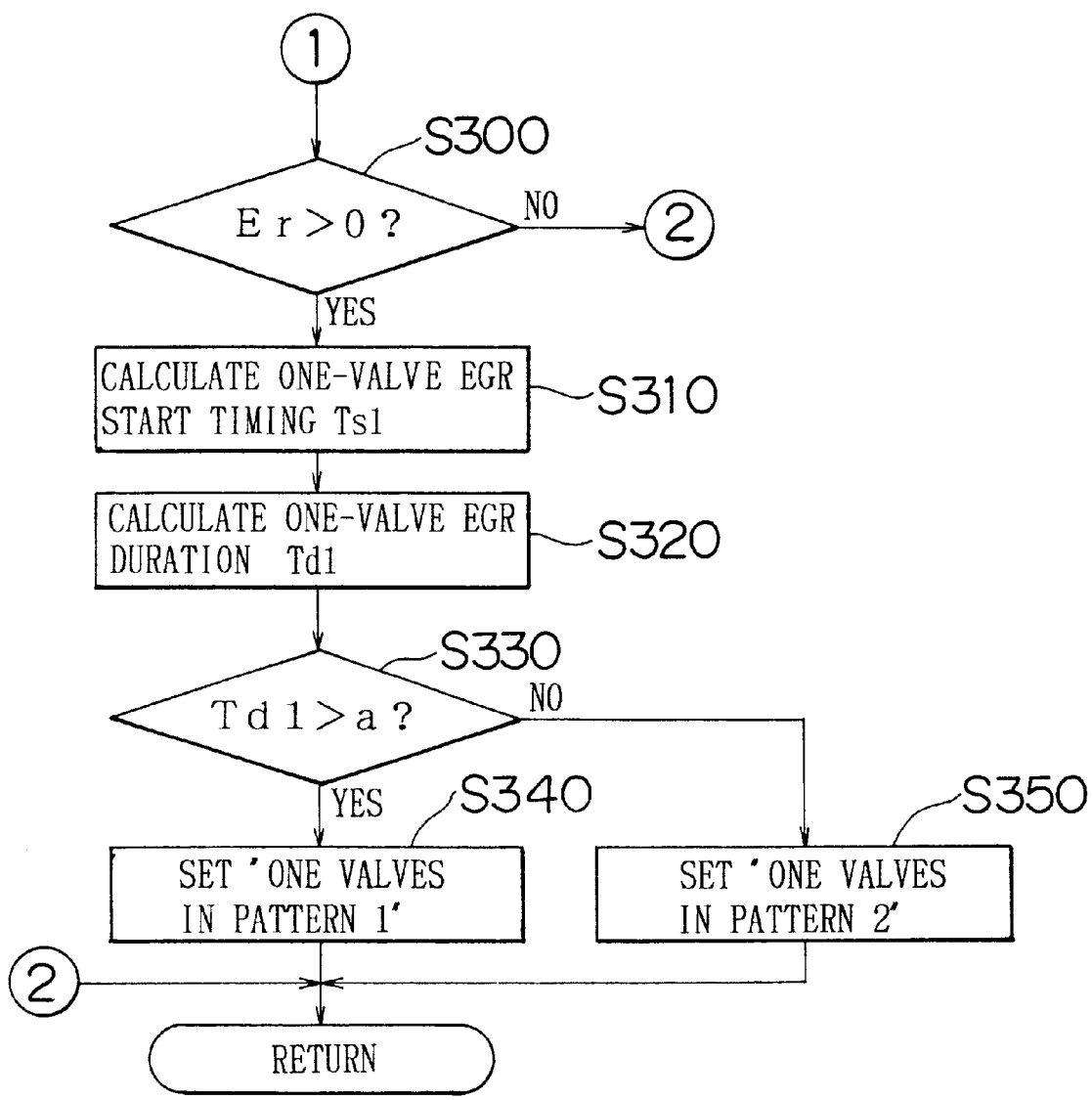
FIG. 8 is a flowchart illustrating the internal EGR control setting operation in the first embodiment.

Of various operations performed by the ECU 60 in the engine 2 constructed as described above, the internal EGR control will be described below. FIGS. 7 and 8 are flowcharts illustrating an internal EGR control setting operation. This operation is executed periodically at every 180° CA (crank angle) provided that a condition for executing the internal EGR control is met. Steps in the flowcharts corresponding to various processings are indicated by "S".

When the internal EGR control setting operation is started, the ECU 60 first reads the engine revolution speed NE detected based on the signal from the crank angle sensor 82, and the load (more specifically, the intake air amount GA detected by the intake air amount sensor 84 in this embodiment) into a work area of the RAM 64 (S200).

Figure 9:
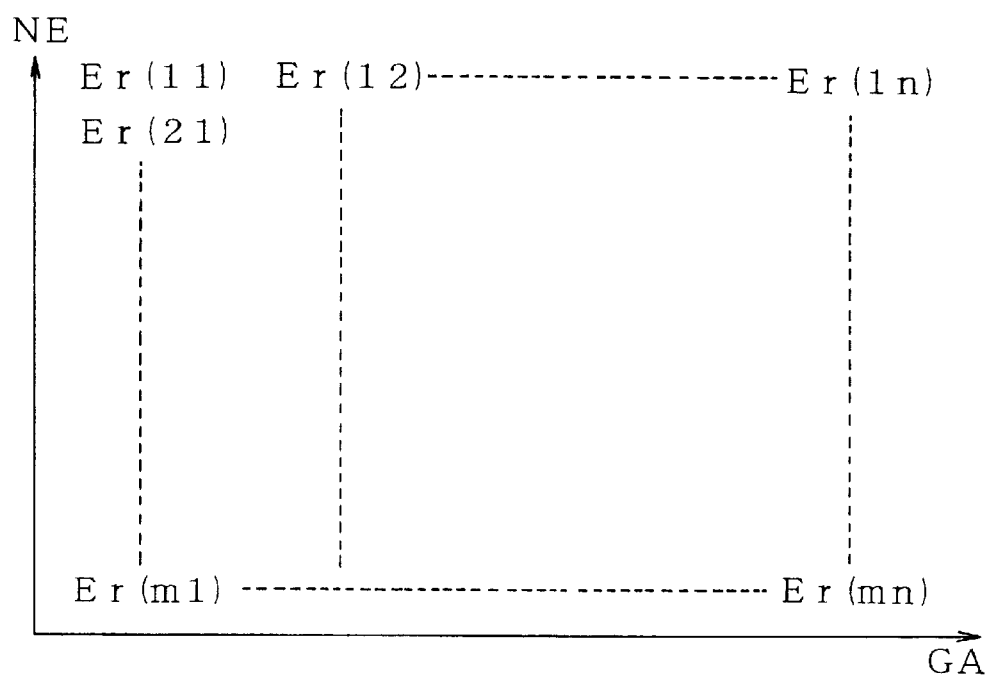
FIG. 9 illustrates a map for determining a required EGR amount Er in the first embodiment.

Then, the ECU 60 calculates a required EGR amount Er from the engine revolution speed NE and the intake air amount GA read in step S200, based on a map illustrated in FIG. 9 (S210). To form this map, suitable EGR amounts corresponding to various operational conditions are empirically determined. Therefore, in the map, the EGR amount is determined in relation to the parameters of the engine revolution speed NE and the intake air amount GA. The map is pre-stored in the ROM 66.

Then, the ECU 60 determines whether the required EGR amount Er is greater than a recirculation amount criterion Es (S220). The recirculation amount criterion Es is a value used to determine whether the internal EGR control can be performed by using both the first exhaust valve 16a and the second exhaust valve 16b or must be performed by using only one of the first exhaust valve 16a and the second exhaust valve 16b in order to achieve a high precision in the internal EGR control. If both the first exhaust valve 16a and the second exhaust valve 16b were used to perform the internal EGR control in all the operational regions, the control based on pattern 2 could become necessary in the case of a relatively small required EGR amount Er. For high precision in the internal EGR control, however, it is desirable that the control be based on pattern 1 as much as possible. Therefore, in order to increase the incidence of the control based on pattern 1, the required EGR amount Er is evaluated in magnitude by using the recirculation amount criterion Es, and it is accordingly determined whether to perform the internal EGR control using both the valves or the internal EGR control using only one of the two valves.

If Er>Es (YES in S220), it is considered that the two exhaust valves 16a, 16b can be opened and closed in pattern 1. Therefore, a second exhaust gas recirculation mode (steps S230 to step 250) is entered.

In the second exhaust gas recirculation mode, the ECU 60 calculates an EGR start timing Ts2 for the internal EGR control performed by driving both the first exhaust valve 16a and the second exhaust valve 16b during the intake stroke (S230). The two-valve EGR start timing Ts2 is calculated, for example, based on a map indicated in FIG. 10 that uses the engine revolution speed NE and the intake air amount GA as parameters. This map is empirically formed. That is, suitable two-valve EGR start timings Ts2 corresponding to various operational conditions are determined in experiments where the two exhaust valves 16a, 16b are driven. Therefore, in the map, the two-valve EGR start timing Ts2 is determined in relation to the parameters of the engine revolution speed NE and the intake air amount GA. The map is pre-stored in the ROM 66.

Subsequently, the ECU 60 calculates an EGR duration Td2 for the internal EGR control performed by driving both the first exhaust valve 16a and the second exhaust valve 16b during the intake stroke (S240). The two-valve EGR duration Td2 is determined based on a map by using the required EGR amount Er determined in step S210 as a parameter. This map is set by empirically determining suitable two-valve EGR durations Td2 corresponding to required EGR amounts Er in experiments where the two exhaust valves 16a, 16b are driven. The map is pre-stored in the ROM 66.

Then, the ECU 60 sets the information of "two-valve drive in pattern 1" as control data to be used in an exhaust valve driving routine (not shown) (S250), in order to perform the internal EGR control during the intake stroke. The information of "two-valve drive in pattern 1" indicates a control in which the first exhaust valve 16a and the second exhaust valve 16b are both driven based on pattern 1 (FIG. 5). Subsequently, the ECU 60 temporarily ends this routine.

When the internal EGR control is set to the "two-valve drive in pattern 1" mode, the ECU 60, in the exhaust valve driving routine, controls the currents supplied to the upper coils 122 and the lower coils 124 of the first exhaust valve 16a and the second exhaust valve 16b in accordance with the two-valve EGR start timing Ts2 and the two-valve EGR duration Td2 during the intake stroke as indicated in FIG. 5.

If it is determined in step S220 that Er≤Es (NO in S220), it is considered that the driving of the two exhaust valves 16a, 16b will not allow the open/close operation based on pattern 1. Therefore, the process proceeds to step S300. In step S300, the ECU 60 determines whether the required EGR amount Er is greater than "0". If Er=0 (NO in S300), which means that there is no need for EGR, the ECU 60 immediately ends the present cycle of the routine.

If Er>0 (YES in S300), a first exhaust gas recirculation mode is entered (steps S310 to S350).

In the first exhaust gas recirculation mode, the ECU 60 calculates an EGR start timing Ts1 for the internal EGR control performed by driving one of the first exhaust valve 16a and the second exhaust valve 16b (e.g., the first exhaust valve 16a in this embodiment) during the intake stroke (S310). The one-valve EGR start timing Ts1 is calculated, for example, based on a map indicated in FIG. 11 that uses the engine revolution speed NE and the intake air amount GA as parameters. This map is empirically formed. That is, suitable one-valve EGR start timings Ts1 corresponding to various operational conditions are determined in experiments where only the first exhaust valve 16a is driven. Therefore, in the map, the one-valve EGR start timing Ts1 is determined in relation to the parameters of the engine revolution speed NE and the intake air amount GA. The map is pre-stored in the ROM 66.

Subsequently, the ECU 60 calculates an EGR duration Td1 for the internal EGR control performed by driving only the first exhaust valve 16a during the intake stroke (S320). The one-valve EGR duration Td1 is determined based on a map by using the required EGR amount Er determined in step S210 as a parameter. This map is set by empirically determining suitable one-valve EGR durations Td1 corresponding to required EGR amounts Er in experiments where only the first exhaust valve 16a is driven. The map is pre-stored in the ROM 66.

Subsequently, the ECU 60 determines whether the one-valve EGR duration Td1 is greater than a criterion a (S330). The criterion a is a value used to determine a situation where the changing of the current and the direction of current for achieving pattern 1 becomes difficult or impossible due to a very small one-valve EGR duration Td1 even though only one of the two exhaust valves is driven.

If Td1>a (YES in S330), the ECU 60 sets the information of "one-valve drive in pattern 1" as control data to be used in the exhaust valve driving routine (S340), in order to perform the internal EGR control during the intake stroke. The information of "one-valve drive in pattern 1" indicates a control in which the first exhaust valve 16a is driven based on pattern 1 (FIG. 5) but the second exhaust valve 16b is not driven. Subsequently, the ECU 60 temporarily ends this routine.

When the internal EGR control is set to the "one-valve drive in pattern 1" mode, the ECU 60 drives only the first exhaust valve 16a in a pattern as indicated in FIG. 5 during the intake stroke in the exhaust valve driving routine. More specifically, the ECU 60 sets a one-valve EGR start timing Ts1 and a one-valve EGR duration Td1, instead of the two-valve EGR start timing Ts2 and the two-valve EGR duration Td2, and controls the currents supplied to the upper coil 122 and the lower coil 124 as indicated in FIG. 5.

If it is determined in step S330 that Td1≤a (NO in S330), the ECU 60 sets the information of "one-valve drive in pattern 2" as control data to be used in the exhaust valve driving routine (S350), in order to perform the internal EGR control during the intake stroke. The information of "one-valve drive in pattern 2" indicates a control in which the first exhaust valve 16a is driven based on pattern 2 (FIG. 6) but the second exhaust valve 16b is not driven. In pattern 2, the one-valve EGR duration Td1 does not exist. Therefore, a control of the current supplied to the upper coil 122 that corresponds to the control based on the one-valve EGR duration Td1 is achieved by adjusting the rising rate of current as indicated by the one-dot chain line in FIG. 6 or adjusting the magnitude of current. It is also possible to omit a control corresponding to the control based on the one-valve EGR duration Td1 and perform the control of current supplied to the upper coil 122 in a constant pattern, since the control range in pattern 2 is relatively narrow.

Then, the ECU 60 temporarily ends the routine.

When the internal EGR control is set to the "one-valve drive in pattern 1" mode, the ECU 60 drives only the first exhaust valve 16a in the pattern indicated in FIG. 6 during the intake stroke by controlling the current supplied to the upper coil 122 in the exhaust gas driving routine.

Figure 12:
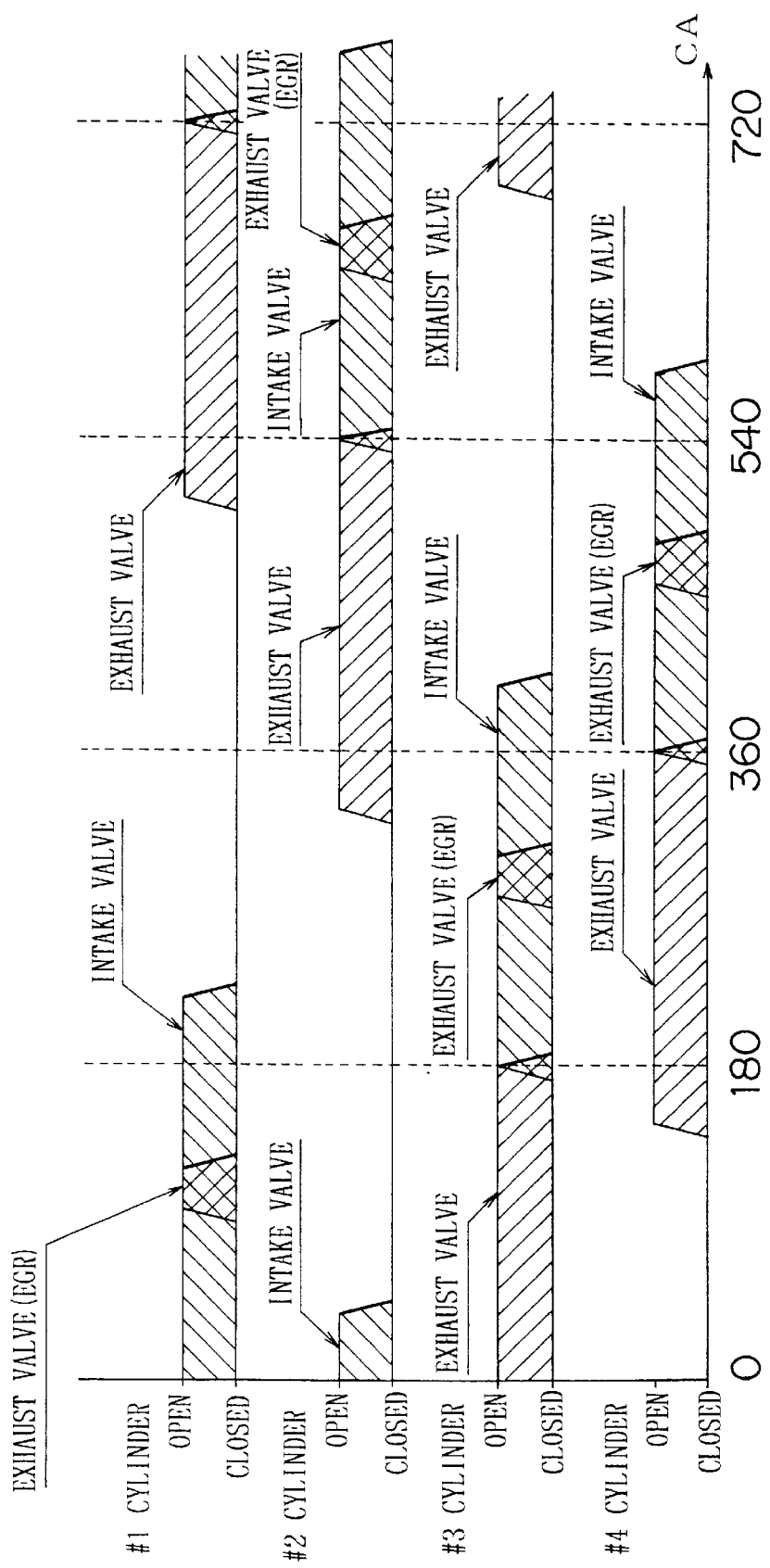
FIG. 12 illustrates the drive states of the intake and exhaust valves of individual cylinders in the first embodiment.

When the engine operation condition becomes a condition that needs internal EGR as a result of the above-described operation, only the first exhaust valve 16a or both the first exhaust valve 16a and the second exhaust valve 16b are opened for the internal EGR control during the intake stroke as indicated in the graph of FIG. 12. Therefore, a necessary amount of the exhaust gas discharged from the combustion chamber 10 can be returned into the combustion chamber 10 via the exhaust ports 18a, 18b during the intake stroke, during which intake air is introduced from the surge tank 32 into the combustion chamber 10 via the opened intake valves 12a, 12b.

In the first embodiment, step S210 corresponds to a process performed by an exhaust gas recirculation amount calculator, and steps S220 to S350 correspond to a process performed by an exhaust valve driver.

The above-described first embodiment achieves the following advantages.

(a) If the required EGR amount Er determined in step S210 is less than the recirculation amount criterion Es (NO in S220) and is not equal to "0" (YES in S300) during the exhaust gas recirculation performed independently of the exhaust stroke, the first exhaust gas recirculation mode (steps S310 to S350) is entered. That is, the exhaust gas recirculation is performed by driving only the first exhaust valve 16a of all the exhaust valves 16a, 16b of each cylinder 2a.

The open valve duration of the first exhaust valve 16a during the exhaust gas recirculation using only that exhaust valve is longer than the open valve duration of the exhaust valves 16a, 16b during the exhaust gas recirculation using the two exhaust valves. Therefore, even if the determination in step S220 is negative, it is possible to set the "one-valve drive in pattern 1" mode in step S340 provided that Td1>a (YES in S330). That is, the incidence of execution of the control based on pattern 2 (S350), which allows only a reduced range of control, decreases. Hence, degradation of the controllability can be substantially prevented even if the required EGR amount Er is small.

(b) If the required EGR amount Er is greater than the recirculation amount criterion Es (YES in S220), the "two-valve drive in pattern 1" mode (S230 to S250) is entered. That is, the exhaust gas recirculation is performed by driving all the exhaust valves 16a, 16b of each cylinder 2a. Since all the exhaust valves 16a, 16b are driven, the exhaust gas recirculation can be reliably and appropriately performed even if the required EGR amount Er becomes considerably large.

A second embodiment of the invention will be described below.

Figure 13:
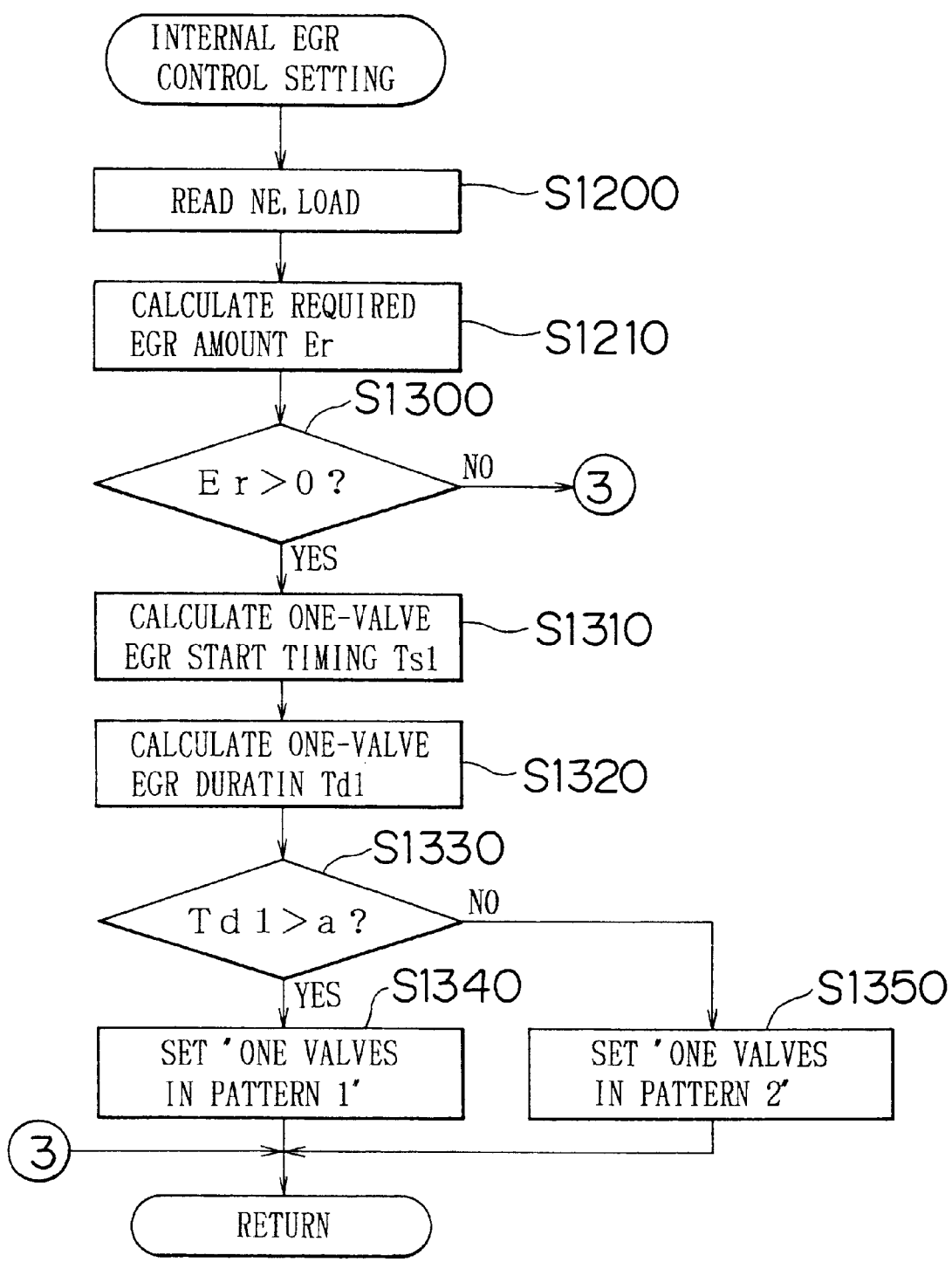
FIG. 13 is a flowchart illustrating an internal EGR control setting operation in a second embodiment of the invention.

The second embodiment differs from the first embodiment in that the second embodiment performs an internal EGR control setting operation illustrated in FIG. 13, instead of the internal EGR control setting operation illustrated in FIGS. 7 and 8. Other constructions and operations of the second embodiment are substantially the same as those of the first embodiment. In the flowchart of FIG. 13, the steps having substantially the same contents as those in the first embodiment are represented by reference numerals obtained by adding "1000" to the corresponding numerals used in FIGS. 8 and 9, unless otherwise mentioned.

In the internal EGR control setting operation illustrated in FIG. 13, the process of steps S220 to S250 in the internal EGR control setting operation of FIGS. 7 and 8 is omitted, so that step S1210 is immediately followed by step S1300. That is, the second exhaust gas recirculation mode (steps S230 to S250) is omitted, and only the first exhaust gas recirculation mode (steps S1310 to S1350) is adopted.

Therefore, in the internal EGR control of the second embodiment, not all the exhaust valves 16a, 16b are driven, but only the first exhaust valve 16a is driven in any case due to the process of steps S1310 to S1350.

In the second embodiment, steps S1310 to S1350 correspond to a process performed by an exhaust valve driver.

The above-described second embodiment achieves the following advantages.

(a) The second embodiment achieves substantially the same advantage (a) of the first embodiment.

A third embodiment of the invention will be described. The third embodiment performs a control as described below, by utilizing constructions of the first and second embodiments.

Figure 14:
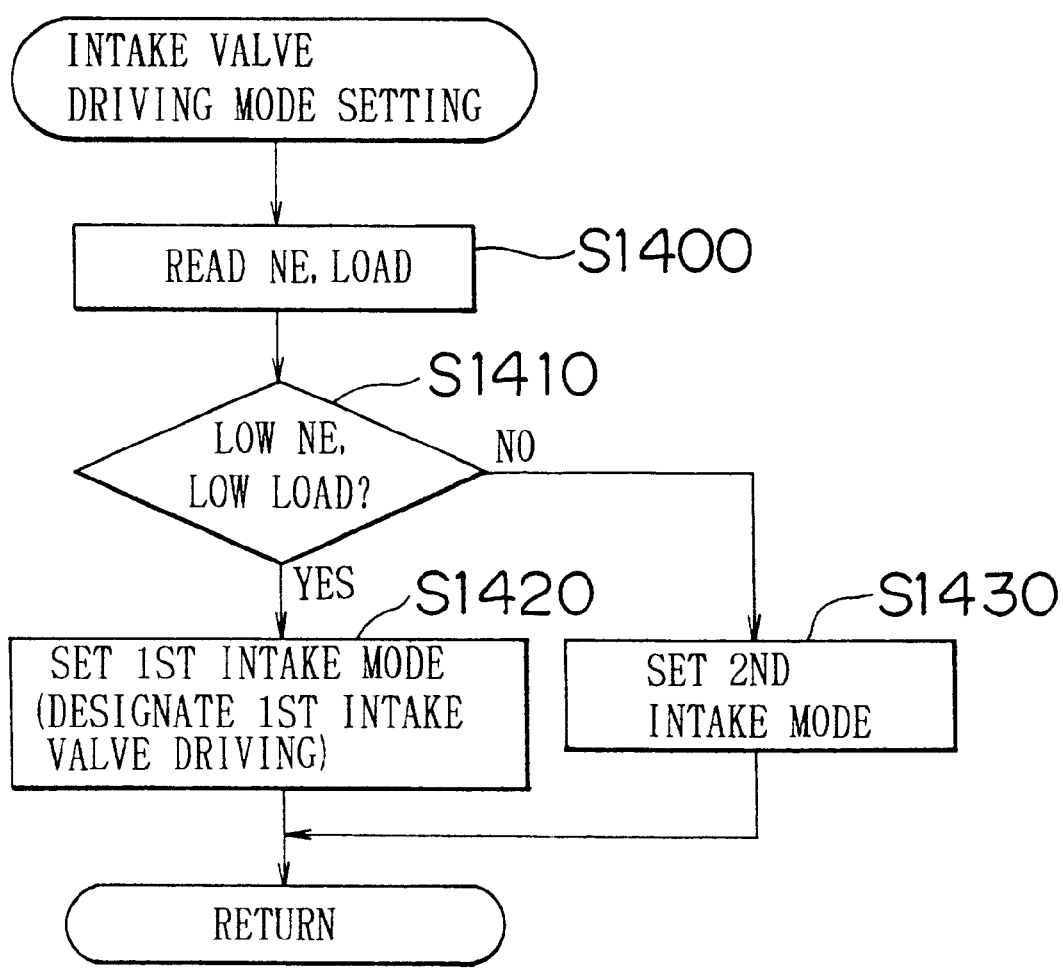
FIG. 14 is a flowchart illustrating an intake valve drive mode setting operation in a third embodiment of the invention.

In the third embodiment, the ECU 60 periodically executes an intake valve driving mode setting operation as illustrated in the flowchart of FIG. 14 in a predetermined cycle, that is, at every 180° CA. Steps in the flowchart of FIG. 14 corresponding to processings are represented by "S".

When the intake valve driving mode setting operation is started, the ECU 60 reads the detection values of the engine revolution speed NE and the load (e.g., the intake air amount GA in this embodiment) into a work area of the RAM 64 (S1400). Subsequently, the ECU 60 determines whether the engine operation is in a low-speed and low-load condition by comparing the detection values NE, GA with their respective thresholds (S1410).

If the engine operation is in the low-speed and low-load condition (YES in S1410), the ECU 60 enters a first intake mode in which the second intake valve 12b is not driven but the first intake valve 12a alone is driven to reduce the electric power for driving the valves (S1420). If the engine operation is not in the low-speed and low-load condition (NO in S1410), the ECU 60 enters a second intake mode in which the two intake valves 12a, 12b are driven, that is, the normal valve driving is performed (S1430). After step S1420 or step S1430 ends, the ECU 60 temporarily ends the intake valve driving mode setting operation.

The ECU 60 also executes the internal EGR control setting operation as in the first or second embodiment. In the third embodiment, however, only the second exhaust valve 16b is selected as an object to be driven during the first exhaust gas recirculation mode (steps S310 to S350 or steps S1310 to S1350). That is, the second exhaust valve 16b disposed diagonally opposite from the first intake valve 12a, which is opened during the first intake mode, is selected as an object to be driven during the internal EGR control.

Figure 15:
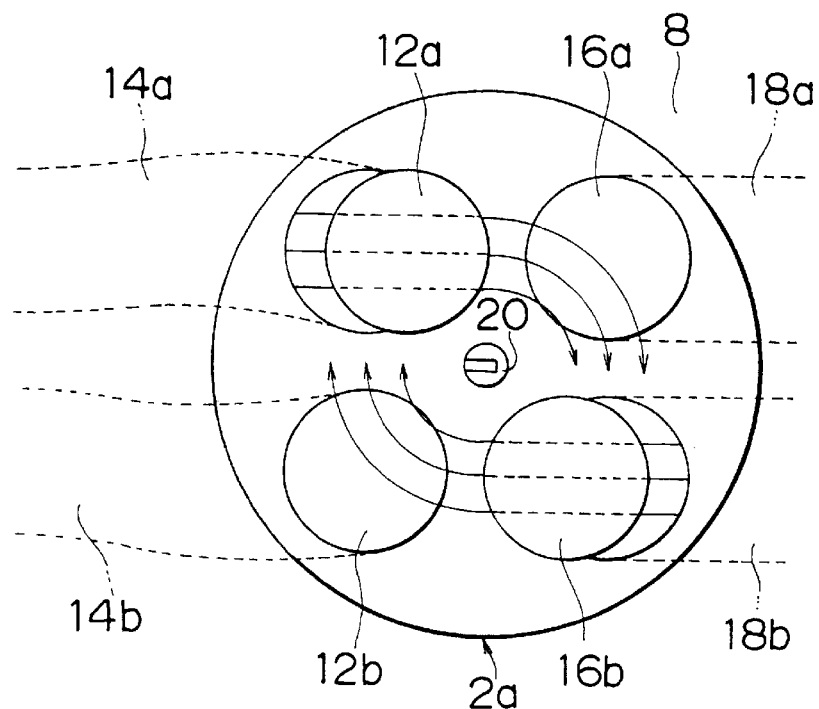
FIG. 15 illustrates swirls in the third embodiment.

Therefore, if the first exhaust gas recirculation mode is entered during the first intake mode, intake air and exhaust gas swirl in the same directions, thereby promoting formation of swirls in the combustion chamber 10, as indicated by arrows in FIG. 15 (showing a state in the combustion chamber 10 in a view taken from the bottom of the cylinder head 8).

In the above-described third embodiment, the intake valve driving mode setting operation illustrated in FIG. 14 corresponds to a process performed by an intake valve driver in the invention.

The third embodiment achieves the following advantages.

(a) Swirls of intake air introduced only via the first intake valve 12*a* during the first intake mode is accelerated by a reverse flow of exhaust gas only via the second exhaust valve 16*b* if the first exhaust gas recirculation mode is entered. In that case, the combustibility further improves.

(b) The third embodiment achieves substantially the same advantages of the first or second embodiments.

Other embodiments of the invention will be described.

In the first to third embodiments, the electromagnetic drive unit 102 is of a type in which no permanent magnet is disposed in the upper core 116 or the lower core 118. However, the invention is also applicable to a construction having electromagnetic drive units in which a permanent magnet is disposed in at least one of an upper core and a lower core.

Although in the first to third embodiment, the internal combustion engine is a gasoline engine, the invention is also applicable to a diesel engine in substantially the same manner.

Figure 10:
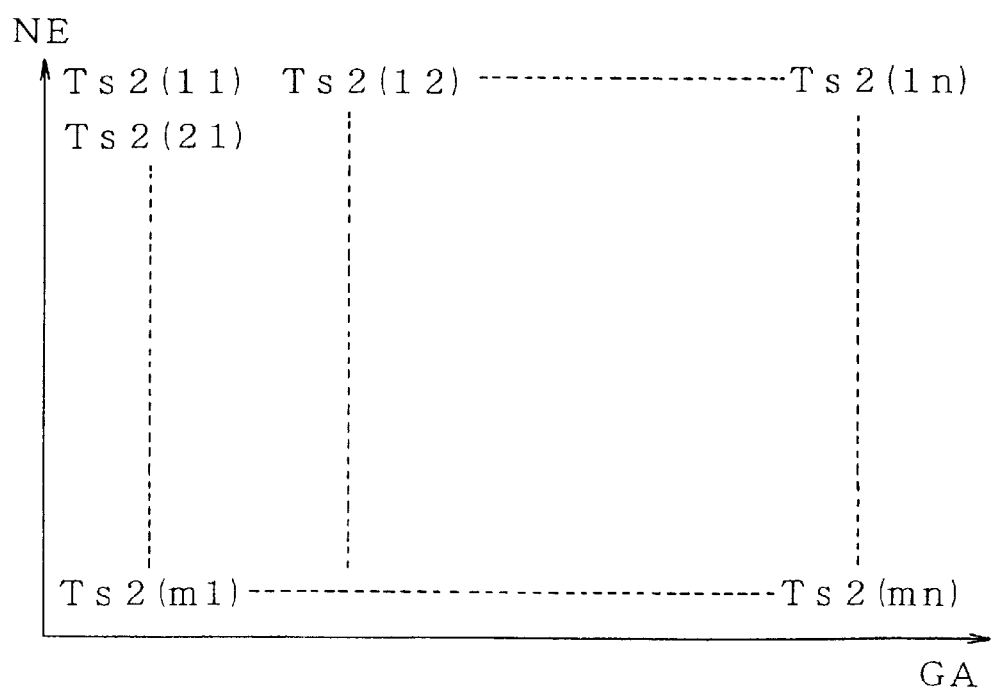
FIG. 10 illustrates a map for determining a two-valve EGR start timing Ts2 in the first embodiment.
Figure 11:
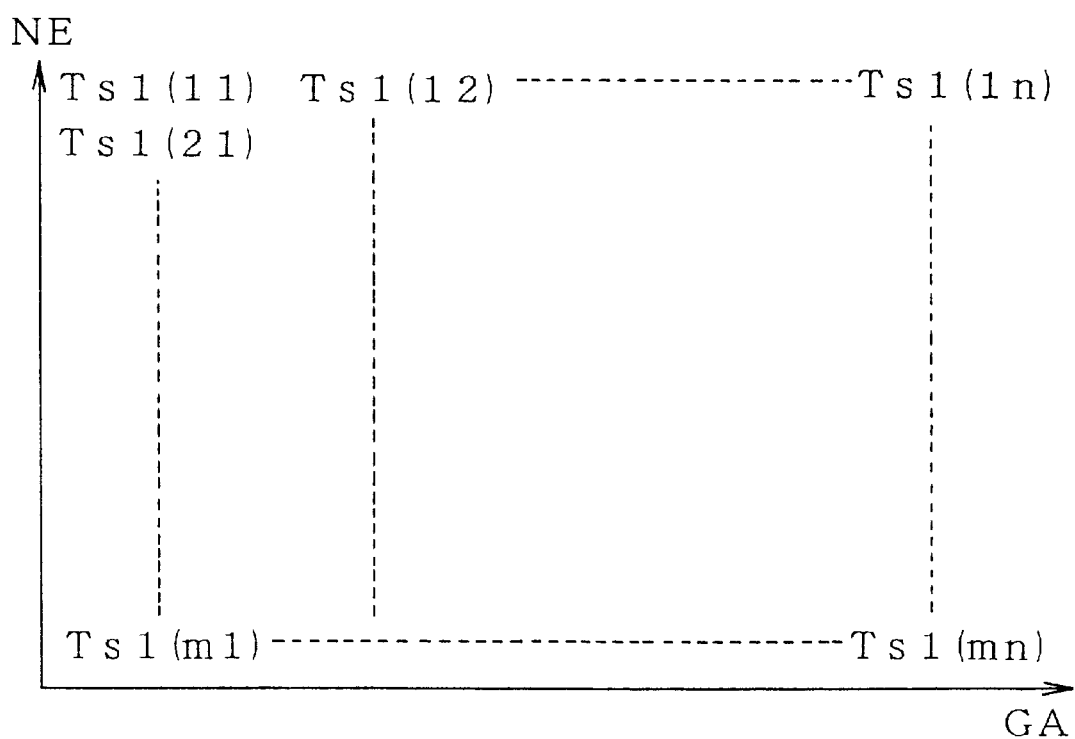
FIG. 11 illustrates a map for determining a one-valve EGR start timing Ts1 in the first embodiment.

Although in the gasoline engine in each of the first to third embodiment, the intake air amount is adjusted by the throttle valve 46, the invention is also applicable to an engine system in which a throttle valve is not disposed in an intake duct 40 but the intake air amount can be adjusted by intake valves 12*a*, 12*b*. In such a case, maps as indicated in FIGS. 9 to 11 may be formed by using the accelerator depression ACCP instead of the engine revolution speed NE.

In the first embodiment, the exhaust valves 16*a*, 16*b* are driven in a valve drive mode suitably selected from the three modes, that is, the "two-valve drive in pattern 1" mode, the "one-valve drive in pattern 1" mode, and the "one-valve drive in pattern 2" mode, based on the magnitude of the required EGR amount Er, and the like. However, the valve drive mode may also be changed among four modes including the aforementioned three modes and a "two-valve drive in pattern 2" mode. In such a case, based on the magnitude of the required EGR amount Er and the like, more specifically, as the required EGR amount Er decreases, the valve drive mode may be changed sequentially in the order of the "two-valve drive in pattern 1" mode, the "one-valve drive in pattern 1", the "two-valve drive in pattern 2" mode, and the "one-valve drive in pattern 2" mode.

Figure 16:
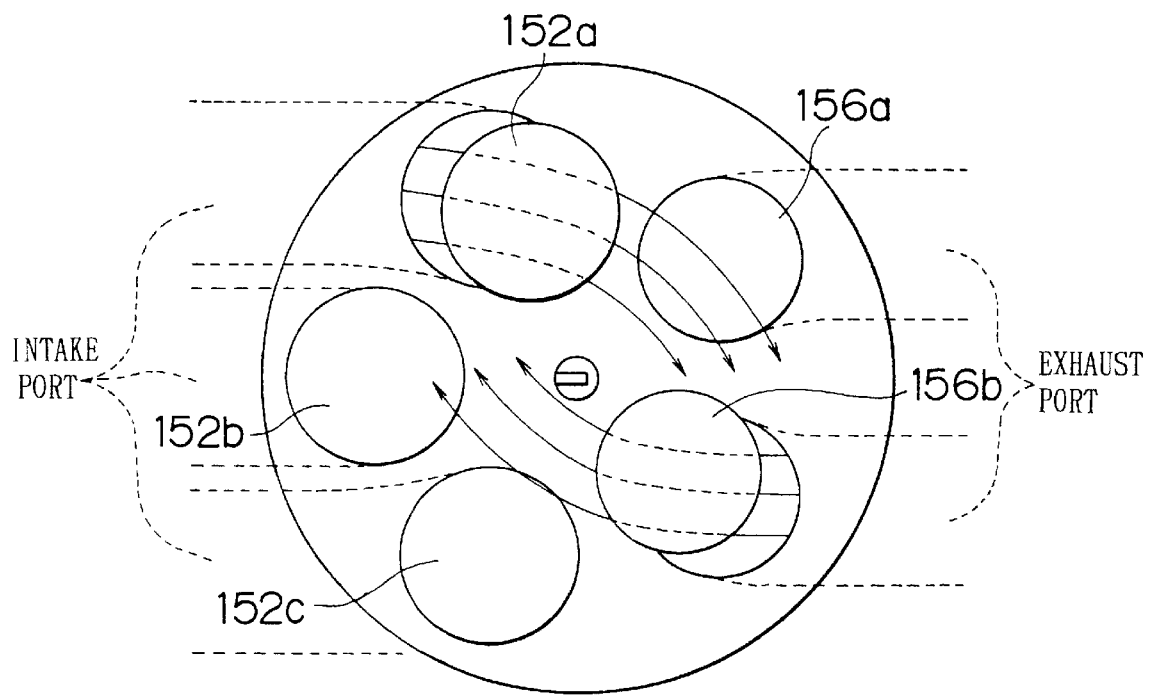
FIG. 16 illustrates swirls in a further embodiment of the invention.

In the third embodiment, an exhaust valve disposed diagonally opposite from an intake valve used as an object to be driven during the first intake mode is set as an object to be driven during the first exhaust gas recirculation mode, while a combination of two intake valves and two exhaust valves is adopted. The invention is also applicable to a combination of three intake valves 152*a*, 152*b*, 152*c* and two exhaust valves 156*a*, 156*b* as shown in FIG. 16. If an exhaust valve 156*b* disposed diagonally opposite from an intake valve 152*a* used as an object to be driven during the first intake mode is set as an object to be driven during the first exhaust gas recirculation mode, the formation of swirls is promoted and the combustibility improves as in the third embodiment.

While the present invention has been described with reference to what are presently considered to be preferred embodiments thereof, it is to be understood that the present invention is not limited to the disclosed embodiments or constructions. On the contrary, the present invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the present invention.

What is claimed is:

1. A valve driving apparatus for an internal combustion engine wherein the engine includes a plurality of electromagnetically operated exhaust valves for each cylinder of the engine, the plurality of exhaust valves including a least one first exhaust valve and a least one second exhaust valve, the valve driving apparatus comprising:

an exhaust valve driver which, in a first exhaust gas recirculation mode when exhaust gas recirculation is performed independently of an exhaust stroke, drives the at least one first exhaust valve and does not drive the at least one second exhaust valve; and an exhaust gas recirculation amount calculator that determines a required exhaust gas recirculation amount in accordance with an operational condition of the engine, wherein the exhaust valve driver operates under the first exhaust gas recirculation mode when the required exhaust gas recirculation amount is less than a recirculation amount criterion and wherein, when the required exhaust gas recirculation amount is greater than the recirculation amount criterion, the exhaust valve driver operates under a second exhaust gas recirculation mode exhaust gas recirculation driving all of the exhaust valves for each cylinder.

2. A valve driving apparatus for an internal combustion engine according to claim 1, wherein an amount of lift by which the exhaust valve driver moves the exhaust valves is determined based on a quantity related to the required exhaust gas recirculation amount.

3. A valve driving apparatus for an internal combustion engine according to claim 2, wherein the quantity related to the required exhaust gas recirculation amount is a required control duration for performing the exhaust gas recirculation.

4. A valve driving apparatus for an internal combustion engine according to claim 3, wherein when the required exhaust gas recirculation amount is less than the recirculation amount criterion and the required control duration is greater than a predetermined threshold, the exhaust valve driver moves only the at least one first exhaust valve to a fully open state and wherein, when the required exhaust gas recirculation amount is less than the recirculation amount criterion and the required control duration is less than the predetermined threshold, the exhaust valve driver moves only the at least one first exhaust valve in a valve opening direction and then moves the at least one first exhaust valve in a valve closing direction before the at least one first exhaust valve reach the fully open state.

5. A valve driving apparatus for an internal combustion engine according to claim 4, wherein the engine includes a plurality of intake valves for each cylinder of the engine, the plurality of intake valves including at least one first intake valve and at least one second intake valve, the valve driving apparatus further comprising an intake valve driver which, in a first intake mode, drives the at least one first intake valve for each cylinder and does not drive the at least one second intake valve for each cylinder and which, in a second intake mode drives all of the intake valves, the intake valve driver switching between the first and second intake modes based on an operational condition of the engine, wherein the exhaust valve driver selects, as one of the first exhaust valves for each cylinder, an exhaust valve positioned to promote a swirl in a combustion chamber during the first intake mode.

6. A valve driving apparatus for an internal combustion engine according to claim 5, wherein each cylinder is provided with two intake valves and two exhaust valves, and wherein the exhaust valve driver selects, as one of the first exhaust valves for each cylinder, an exhaust valve disposed diagonally opposite from an intake valve selected as one of the first intake valves for the corresponding cylinder.

7. A valve driving apparatus for an internal combustion engine according to claim 1, wherein the engine includes a plurality of intake valves for each cylinder of the engine, the plurality of intake valves including at least one first intake valve and at least one second intake valve, the valve driving apparatus further comprising an intake valve driver which, in a first intake mode, drives the at least one first intake valve for each cylinder and does not drive the at least one second intake valve for each cylinder and which, in a second intake mode drives all of the intake valves, the intake valve driver switching between the first and second intake modes based on an operational condition of the engine, wherein the exhaust valve driver selects, as one of the first exhaust valves of each cylinder, an exhaust valve positioned to promote a swirl that occurs in a combustion chamber during the first intake mode.

8. A valve driving apparatus for an internal combustion engine according to claim 7, wherein each cylinder is provided with two intake valves and two exhaust valves, and wherein the exhaust valve driver selects, as one of the first exhaust valves of each cylinder, an exhaust valve disposed diagonally opposite from an intake valve selected as one of the first intake valves for the corresponding cylinder.

9. A valve driving apparatus for an internal combustion engine according to claim 1, wherein the engine includes a plurality of intake valves for each cylinder of the engine, the plurality of intake valves including at least one first intake valve and at least one second intake valve, the valve driving apparatus further comprising an intake valve driver which, in a first intake mode, drives the at least one first intake valve for each cylinder and does not drive the at least one second intake valve for each cylinder and which, in a second intake mode drives all of the intake valves, the intake valve driver switching between the first and second intake modes based on an operational condition of the engine, wherein the exhaust valve driver selects, as one of the first exhaust valves of each cylinder, an exhaust valve positioned to promote a swirl that occurs in a combustion chamber during the first intake mode.

10. A valve driving apparatus for an internal combustion engine according to claim 9, wherein each cylinder is provided with two intake valves and two exhaust valves, and wherein the exhaust valve driver selects, as one of the first exhaust valves of each cylinder, an exhaust valve disposed diagonally opposite from an intake valve selected as one of the first intake valves for the corresponding cylinder.

11. A valve driving method for an internal combustion engine in which each cylinder of the engine is provided with a plurality of electromagnetically operated exhaust valves, the plurality of exhaust valves including at least one first exhaust valve and at least one second exhaust valve, the method comprising the steps of:

performing exhaust gas recirculation by driving, when exhaust gas recirculation is performed independently of an exhaust stroke, the at least one first exhaust valve of each cylinder while not driving the at least one second exhaust valve of each cylinder; and determining a required exhaust gas recirculation amount in accordance with an operational condition of the engine, wherein, when the required exhaust gas recirculation amount is less than a recirculation amount criterion, exhaust gas recirculation is performed by driving only the at least one first exhaust valve, and wherein when the required exhaust gas recirculation amount is greater than the recirculation amount criterion, exhaust gas recirculation is performed by driving all of the exhaust valves for each cylinder.

12. A valve driving method for an internal combustion engine according to claim 11, wherein the engine includes a plurality of intake valves for each cylinder of the engine, the plurality of intake valves including at least one first intake valve and at least one second intake valve, wherein the valve driving method further comprises switching between a first intake mode in which the at least one first intake valve of each cylinder is driven during an intake stroke while the at least one second intake valve of each cylinder is not driven and a second intake mode in which all of the intake valves for each cylinder are driven and selecting, as one of the first exhaust valves for each cylinder, an exhaust positioned to promote a swirl that occurs in a combustion chamber during the first intake.

13. A valve driving method for an internal combustion engine according to claim 12, wherein each cylinder is provided with two intake valves and two exhaust valves, and wherein an exhaust valve disposed diagonally opposite from the first intake valve of each cylinder is selected as one of the first exhaust valves of each cylinder.

14. A valve driving method for an internal combustion engine according to claim 11, wherein the engine includes a plurality of intake valves for each cylinder of the engine, the plurality of intake valves including at least one first intake valve and at least one second intake valve, wherein the valve driving method further comprises switching between a first intake mode in which the at least one first intake valve of each cylinder is driven during an intake stroke while the at least one second intake valve of each cylinder is not driven and a second intake mode in which all of the intake valves for each cylinder are driven and selecting, as one of the first exhaust valves for each cylinder, an exhaust positioned to promote a swirl that occurs in a combustion chamber during the first intake.

15. A valve driving method for an internal combustion engine according to claim 14, wherein each cylinder is provided with two intake valves and two exhaust valves, and wherein an exhaust valve disposed diagonally opposite from the first intake valve of each cylinder is selected as one of the first exhaust valves of each cylinder.

* * * * *

UNITED STATES PATENT AND TRADEMARK OFFICE
CERTIFICATE OF CORRECTION

PATENT NO.    : 6,374,813 B1
DATED         : April 23, 2002
INVENTOR(S)   : Iida et al.

It is certified that error appears in the above-identified patent and that said Letters Patent is hereby corrected as shown below:

<u>Title page, Item [54] and Column 1, line 1,</u>
Change "DURING" to -- DRIVING --.

Signed and Sealed this

First Day of April, 2003

JAMES E. ROGAN
*Director of the United States Patent and Trademark Office*